(12) United States Patent
Brow et al.

(10) Patent No.: US 8,679,389 B2
(45) Date of Patent: Mar. 25, 2014

(54) CORROSION-RESISTANT GLASSES FOR STEEL ENAMELS

(76) Inventors: Richard K Brow, Rolla, MO (US); Signo T. Reis, Rolla, MO (US); Mike Konigstein, Columbia, MO (US); Genda Chen, Rolla, MO (US)

( * ) Notice: Subject to any disclaimer, the term of this patent is extended or adjusted under 35 U.S.C. 154(b) by 273 days.

(21) Appl. No.: 13/040,781

(22) Filed: Mar. 4, 2011

(65) Prior Publication Data

US 2012/0164340 A1 Jun. 28, 2012

Related U.S. Application Data

(62) Division of application No. 12/623,236, filed on Nov. 20, 2009, now Pat. No. 7,901,769.

(60) Provisional application No. 61/199,901, filed on Nov. 21, 2008.

(51) Int. Cl.
  *B05D 7/14* (2006.01)

(52) U.S. Cl.
  USPC .......................................................... 264/135

(58) Field of Classification Search
  USPC .......................................................... 264/135
  See application file for complete search history.

(56) References Cited

U.S. PATENT DOCUMENTS

| | | | | |
|---|---|---|---|---|
| 6,001,494 A | * | 12/1999 | Kuchinski et al. | 428/653 |
| 2007/0264527 A1 | * | 11/2007 | Sykes et al. | 428/702 |
| 2009/0155118 A1 | * | 6/2009 | Kan et al. | 420/91 |

* cited by examiner

Primary Examiner — Larry Thrower
Assistant Examiner — Xue Liu
(74) Attorney, Agent, or Firm — C. John Brannon; Brannon Sowers & Cracraft PC

(57) ABSTRACT

A cementitious composite material wherein glass-coated steel rods are positioned in a cementitious matrix. The glass composition for coating the steel reinforcing rods includes between about 33-45 weight percent $SiO_2$, 13.5-19.5 weight percent $B_2O_3$, 3.5-4.6 weight percent $Al_2O_3$, 4.0-13.5 weight percent $K_2O$, 5.5-15.5 weight percent $ZrO_2$, 8.6-15.9 weight percent $Na_2O$, 4.6-5.1 weight percent CaO, 0.6-0.7 weight percent $MnO_2$, 1.0-1.0 weight percent NiO, and 1.0-1.1 weight percent CoO. The glass composition is typically in compression on the rods at ambient temperatures, has a coefficient of thermal expansion of between about 12.5 and about 13.5, and has a softening temperature of between about 585 degrees Celsius and about 600 degrees Celsius.

18 Claims, 6 Drawing Sheets

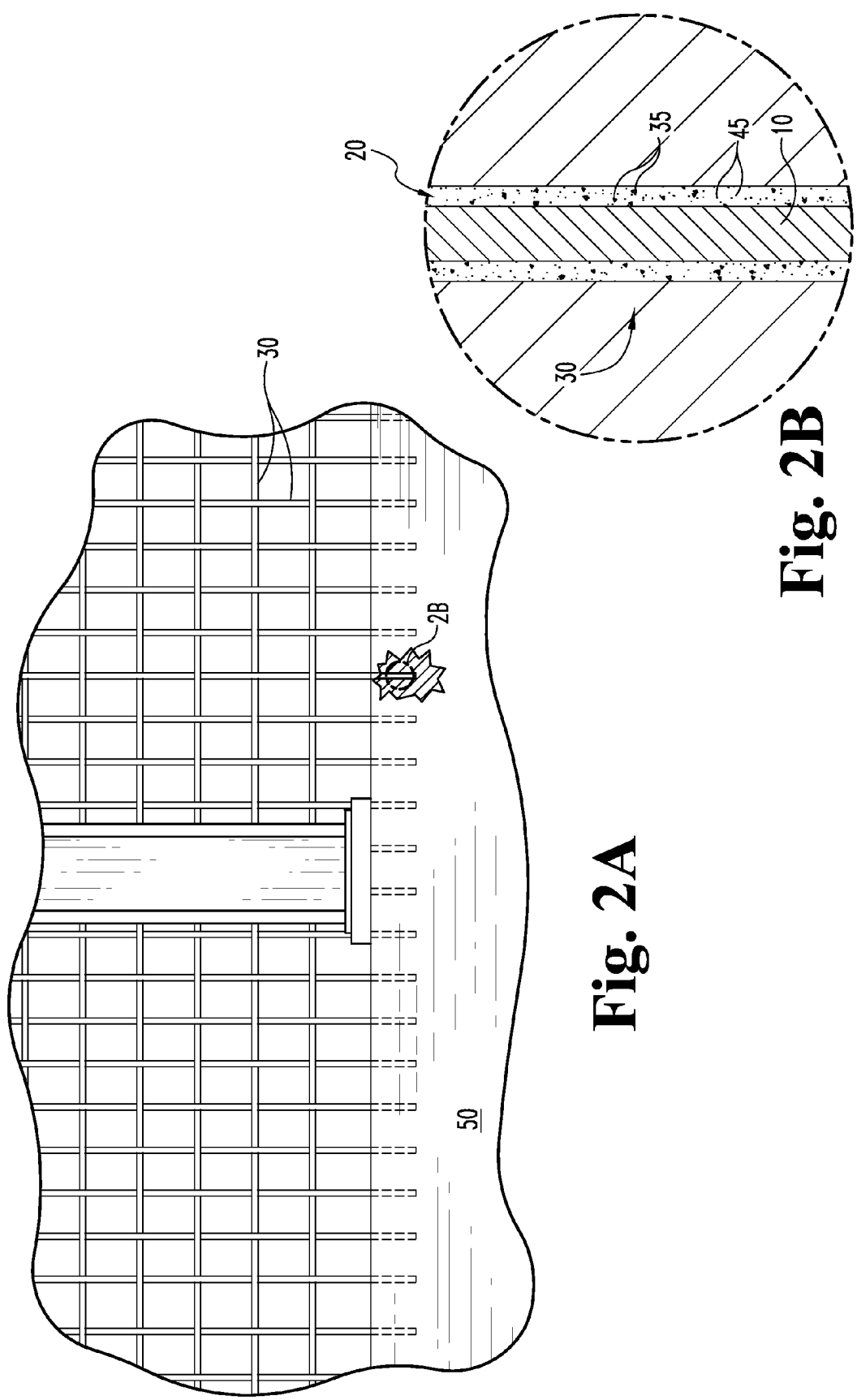

CORROSION-RESISTANT GLASSES FOR STEEL ENAMELS

CROSS-REFERENCE TO RELATED APPLICATIONS

This patent application claims priority to co-pending U.S. patent application Ser. No. 12/623,236, filed on Nov. 20, 2009, which claimed priority to then U.S. Provisional Patent Application Ser. No. 61/199,901, filed Nov. 21, 2008.

GRANT STATEMENT

The invention was made in part from government support under Grant No. W911NF-07-2-0062 from the Department of the Army. The U.S. Government has certain rights in the invention.

TECHNICAL FIELD

The present invention relates to structural materials and, more particularly, to a new and improved glass composite developed for coating steel elements for reinforcing concrete structures.

BACKGROUND

One material very commonly selected for large-scale construction projects is reinforced concrete (RC). Several years ago, the Army Corps of Engineers discovered that the use of a modified vitreous enamel improved the bond strength, and, possibly, the corrosion resistance of the steel rods reinforcing the concrete. The enamel consisted of a glass matrix embedded with reactive ceramic particles. The glass composition was designed to strongly adhere to the steel, and the reactive particles were imbedded to chemically react with the surrounding cement to form another strong bond.

The materials used for these initial tests included commercial alkali-resistant groundcoat enamels for steels used in a variety of consumer and industrial applications. The typical compositional ranges for such enamels are summarized below as Table 1.

TABLE 1

Compositional ranges for typical alkali-resistant groundcoats

| Constituent | Range (wt %) |
| --- | --- |
| Silicon dioxide $SiO_2$ | 40-45 |
| Boron oxide $B_2O_3$ | 16-20 |
| Na oxide $Na_2O$ | 15-18 |
| K oxide $K_2O$ | 2-4 |
| Li oxide $Li_2O$ | 1-2 |
| Ca oxide $CaO$ | 3-5 |
| Aluminum oxide $Al_2O_3$ | 3-5 |
| Zr oxide $ZrO_2$ | 4-6 |
| Mn dioxide $MnO_2$ | 1-2 |
| Ni oxide $NiO$ | 1-2 |
| Cobalt oxide $Co_3O_4$ | 0.5-1.5 |
| Phosphorus oxide $P_2O_5$ | 0.5-1 |

The ratio of the $Na_2O$, $B_2O_3$, and $SiO_2$ components, as well as the addition of other alkali ($K_2O$ and $Li_2O$) and alkaline earth oxides ($CaO$), have the greatest effect on the thermal properties of the glass. Constituents like $Al_2O_3$ are added to improve the corrosion-resistance of the glass. $ZrO_2$ (and $P_2O_5$) is usually added to an enamel as an opacifier to affect the visual appearance of the coating. However, zirconia has the added advantage of improving the chemical resistance of silicate glasses to attack by alkaline environments. Alkaline-resistant silicate glass fibers developed for reinforcing cement composites typically contain 10-20 wt % $ZrO_2$, and a protective coating of Zr-oxyhydroxide forms on the glass surface when exposed to an alkaline environment, further impeding corrosion. Transition metal oxides, like $MnO_2$, $Co_3O_4$, and $NiO$, are added to enamels to aid bonding to the substrate.

In general, these materials are sodium-borosilicate glasses modified with various constituents to tailor thermal and chemical properties. However, the conventional groundcoat enamels (such as the ones listed in Table 1) are designed with thermal properties tailored for the steel alloys used in commercial and industrial applications. Therefore, there is a need to provide a new and improved glass composite having physical and chemical properties specifically suited for coating the reinforcing steel used in RC structures, specifically with thermal properties tailored for steel alloys used in RC structures and with chemical properties designed for alkaline cement environments. There is likewise a need for reinforcing steel members having corrosion resistant coatings better matched to the physical properties of the underlying steel so as to better adhere thereto. Finally, there remains a need for an improved steel-concrete composite material wherein the steel phase is more securely bonded within the concrete matrix phase to yield a tougher composite material. The present novel technology addresses these needs.

SUMMARY

The present novel technology relates to a glass composition having thermal expansion and corrosion resistance desirable for coating steel rods used in RC concrete applications. The glass composition for coating steel reinforcing rods typically includes $SiO_2$ present in between about 33 and about 45 weight percent; $B_2O_3$ present in between about 13.5 and about 19.5 weight percent; $Al_2O_3$ present in between about 3.5 and about 4.6 weight percent; $K_2O$ present in between about 4.0 and about 13.5 weight percent; $ZrO_2$ present in between about 5.5 and about 15.5 weight percent; $Na_2O$ present in between about 8.6 and 15.9 weight percent; $CaO$ present in between about 4.6 and about 5.1 weight percent; $MnO_2$ present in between about 0.6 and about 0.7 weight percent; $NiO$ present in between about 1.0 and about 1.1 weight percent; and $CoO$ present in between about 1.0 and about 1.1 weight percent. The glass composition has a coefficient of thermal expansion of between about 12.5 and about 13.5 and has a softening temperature of between about 585 degrees Celsius and about 600 degrees Celsius.

One object of the present novel technology is to provide an improved steel reinforced concrete system including the same. Related objects and advantages of the present novel technology will be apparent from the following description.

BRIEF DESCRIPTION OF DRAWINGS

FIG. 2A is a perspective view of a first plurality of steel rods according to FIG. 1 embedded in a cementitious material to yield a first composite material according to a second embodiment of the present novel technology.

FIG. 2B is an enlarged partial view of one of the embedded rods of FIG. 2A.

DETAILED DESCRIPTION

Figure 1:
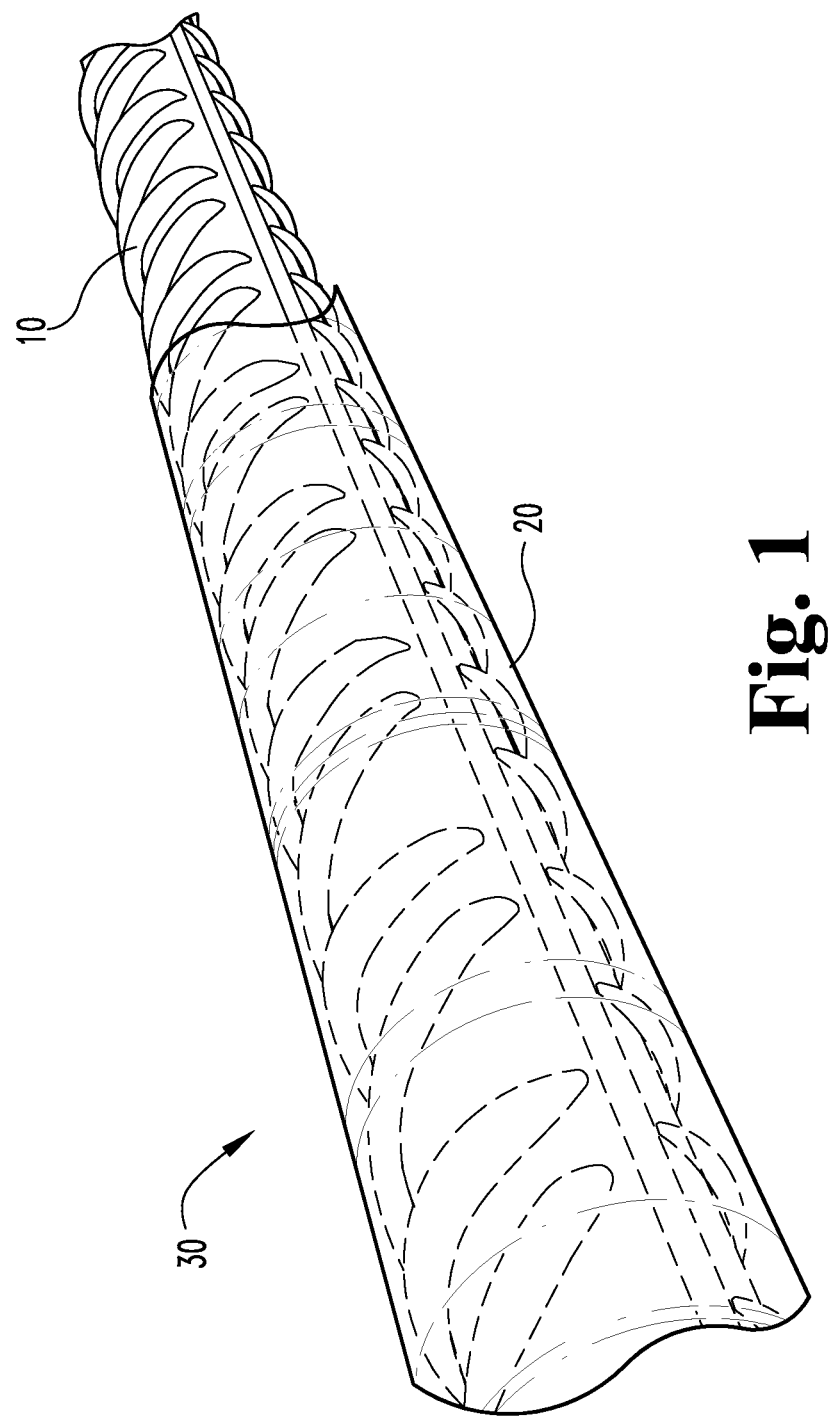
FIG. 1 is a cutaway perspective view of a steel rod coated with a vitreous material according to a first embodiment of the present novel technology.
Figure 3A:
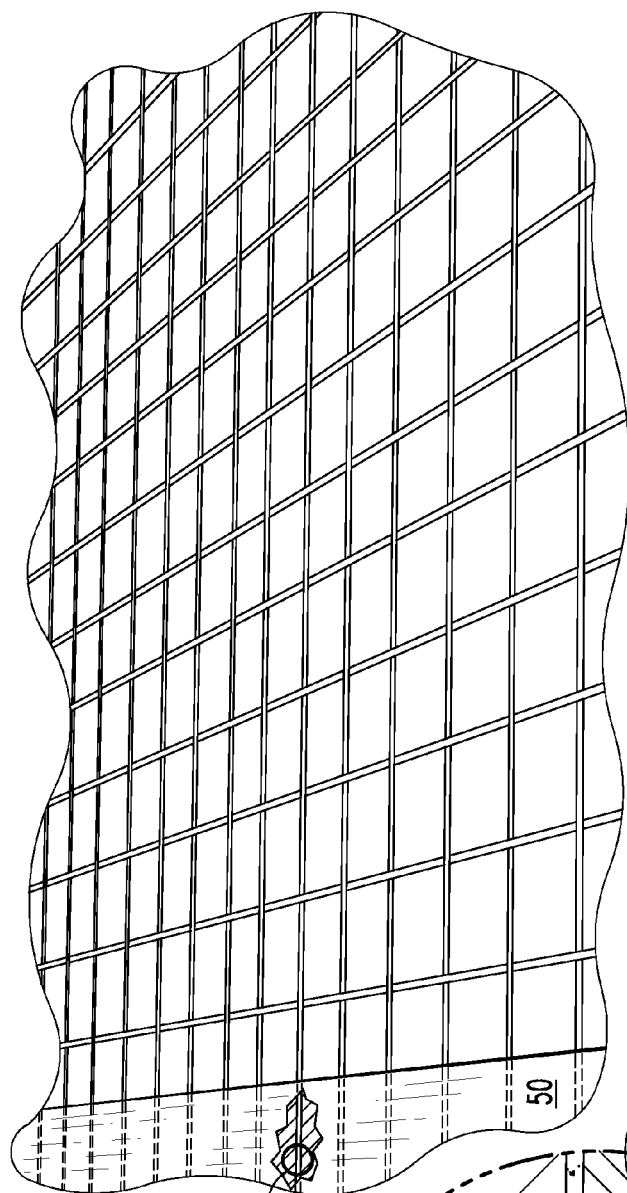
FIG. 3A is a perspective view of a second plurality of steel rods according to FIG. 1 embedded in a cementitious material to yield a second composite material according to a second embodiment of the present novel technology.
Figure 3B:
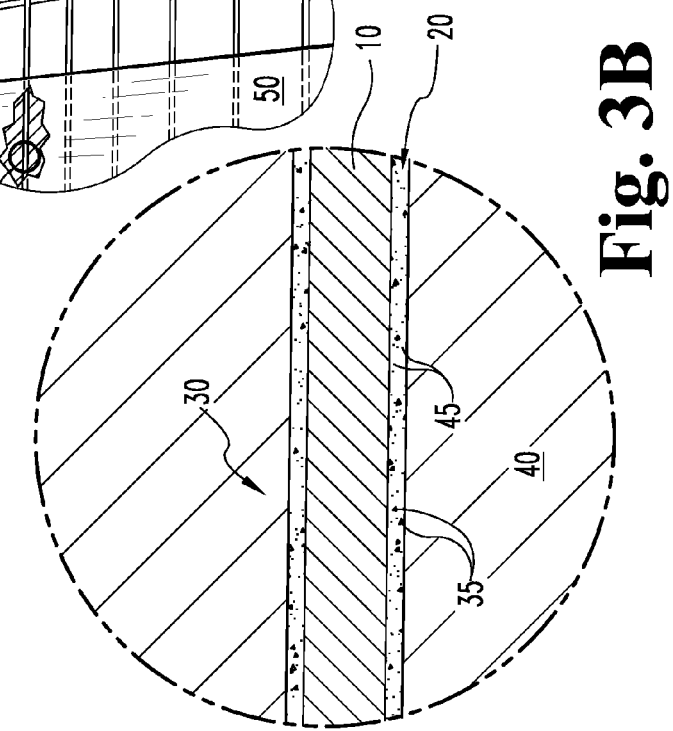
FIG. 3B is an enlarged partial view of one of the embedded rods of FIG. 2A.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Unless otherwise defined, all technical and scientific terms used herein have the same meaning as commonly understood by one of ordinary skill in the art to which this invention belongs.

In one embodiment, steel reinforcing rods 10 are coated with the novel glass composition 20 to yield coated reinforcing rods 30. The glass coating 20 is particularly suitable for coating the steel alloys used in the rods 10, as the glass coating 20 typically has a coefficient of thermal expansion close to but lower than that of the steel rods 10, such that the glass coating 20 is maintained in compression. Further, the glass coating 20 is substantially more corrosion resistant than the conventional enamel coatings known in the art. Specifically, the thermal properties of the glass coatings are tailored for the steel alloys used in RC structures, which have different thermal expansion coefficients than the alloys used in commercial and industrial applications for which the conventional groundcoat compositions were designed. Typically, the steel alloys used in the rods 10 are ASTM A 615, 706, 955, 996 or the like, which typically have thermal expansion coefficients of from about 14 ppm/° C. to about 17 ppm/° C. The glass coating 20 typically has a thermal expansion coefficient of between about 12.5 ppm/° C. and about 13.5 ppm/° C. at ambient temperatures.

In particular, the borate-to-silicate ratio and the fraction and type of alkali oxide of the coatings 20 has been optimized to yield coatings 20 characterized by greater CTE to improve the thermomechanical compatibility with typical reinforcing steel. In other words, the CTE of the glass coatings 20 has been raised to be closer to that of typical steel rebars 10 while remaining slightly lower than the steel CTE, such that the glass coating 20 is put into compression 20 but not so much so that it fails and disengages therefrom. Further, this CTE matching was accomplished without sacrificing chemical durability of the glass coating 20. Thus, by better matching the thermomechanical properties of the glass coatings 20 to the steel members 10, the glass coatings 20 are less prone to failure due to stresses arising from thermal cycling and thus remain on the steel members 10 where they can participate in the bonding process with a surrounding cementitious matrix material.

Additionally, the corrosion resistance of the glass coatings 20 is especially attractive in alkaline environments. The glass coatings 20 typically includes substantially increased concentrations of CaO, $K_2O$ and, more typically, $ZrO_2$ at levels substantially greater than the typical enamel compositional ranges to provide increased corrosion resistance of the glass coated rods 30 in alkaline environments.

In some embodiments, as seen in FIGS. 2A-3B, cement-reactive particles 35, such as calcium silicate, are dispersed in the glass coatings 20 to enhance bonding with a cement matrix 40 to result in a steel-reinforced concrete composite material 50 having increased bond strength between the coated rods 30 and the cement matrix 40. Such a material 50 will exhibit a substantially increased pull-out strength and be inherently tougher. Alternately (or additionally), metal particles 45 such as zinc may be dispersed in the glass coating 20 to act as sacrificial anodes for further protecting the steel rods 30 from the corrosive effects of the cementious matrix 40. Still alternately, such sacrificial anode particles 45 may be added directly to the cement, either throughout or preferentially near the steel rods 10, to react locally with the corrosive cementitious matrix 40 to divert its attack on the steel rods 10. As they are corroded, the sacrificial metal particles 45 will expand to provide both physical as well as chemical protection, chemically reacting with corrosives and physically blocking the corrosion pathways.

Table 2 shows the compositions of several embodiments of the glass coating 20, along with test results of the dilatometric softening point and the CTE, designated ARE-1 through ARE-5. For comparison, the composition and properties of a standard (conventional) alkali-resistant groundcoat composition is presented and designated ARG.

TABLE 2

Comparision between the novel glass coating compositions and ARG

| wt % | ARE-1 | ARE-2 | ARE-3 | ARE-4 | ARE-5 | ARE-11 | ARG |
|---|---|---|---|---|---|---|---|
| $SiO_2$ | 44.5 | 43.4 | 39.7 | 42.0 | 33.2 | 39.3 | 44.0 |
| $B_2O_3$ | 17.9 | 14.4 | 14.0 | 13.9 | 19.2 | 13.0 | 19.3 |
| $Na_2O$ | 15.9 | 15.5 | 15.1 | 8.9 | 8.6 | 8.3 | 15.8 |
| $K_2O$ | 4.3 | 4.2 | 4.1 | 13.5 | 13.0 | 12.6 | 2.8 |
| CaO | 5.1 | 5.0 | 4.8 | 4.8 | 4.6 | 4.5 | 4.7 $CaF_2$ |
| $Al_2O_3$ | 3.6 | 3.8 | 3.7 | 3.6 | 3.5 | 3.4 | 4.6 |
| $ZrO_2$ | 5.6 | 10.9 | 10.6 | 10.6 | 15.3 | 9.9 | 5.3 |
| $MnO_2$ | 0.7 | 0.6 | 0.6 | 0.6 | 0.6 | 0.6 | 1.5 |
| NiO | 1.1 | 1.1 | 1.1 | 1.1 | 1.0 | 1.0 | 1.0 |
| CoO | 1.1 | 1.1 | 1.1 | 1.1 | 1.0 | 1.0 | 0.9 |
| $P_2O_5$ | 0 | 0 | 0 | 0 | 0 | 6.4 | |

TABLE 2-continued

Comparision between the novel glass coating compositions and ARG

| wt % | ARE-1 | ARE-2 | ARE-3 | ARE-4 | ARE-5 | ARE-11 | ARG |
|---|---|---|---|---|---|---|---|
| Soft Temp (° C.) | 600 | 586 | 600 | 600 | 594 | 610 | 576 |
| CTE (ppm/° C.) | 13.5 | 12.9 | 12.5 | 12.9 | 12.7 | 10.8 | 12.2 |

Figure 4:
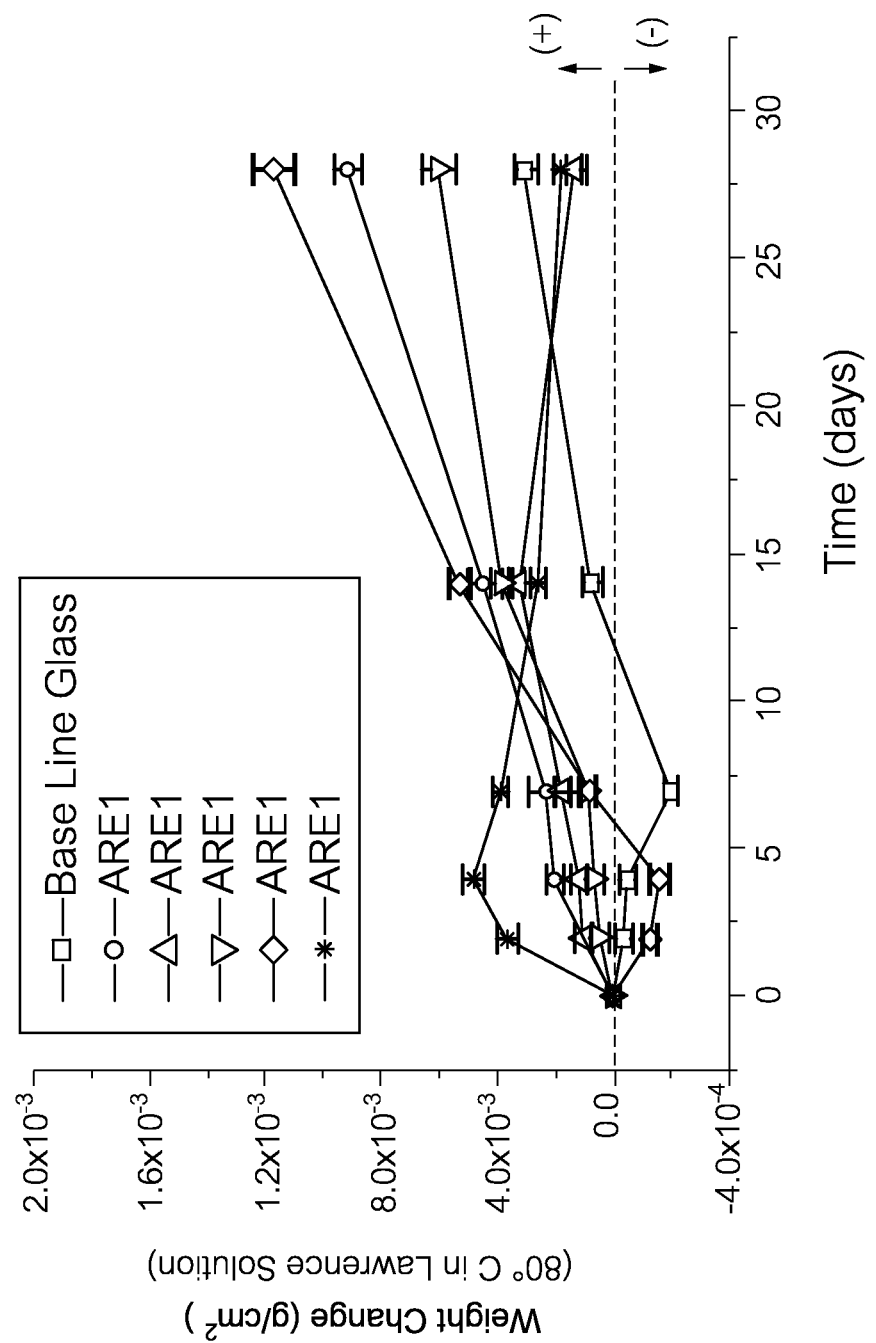
FIG. 4 shows weight changes for glasses after up to 28 days in alkaline Lawrence Solution at 80° C.

FIG. 4 shows the change in weight for glass samples after up to 28 days at 80° C. in Lawrence solution (pH=13). The $K_2O$ and $ZrO_2$ contents of the ARE-series glass coatings 20 are each, respectively, greater than those of the ARG composition, and the weight changes of ARE compositions 2 and 5 are respectively less than that of the ARG glass.

In another embodiment, reinforced concrete 50 was prepared by the pouring wet concrete over coated rods 30 and allowing the concrete to dry and cure to define a concrete matrix 40, yielding a reinforced concrete composite material 50. The bonding of the coated rods 30 in the concrete matrix 40 was analytically measured.

Figure 5:
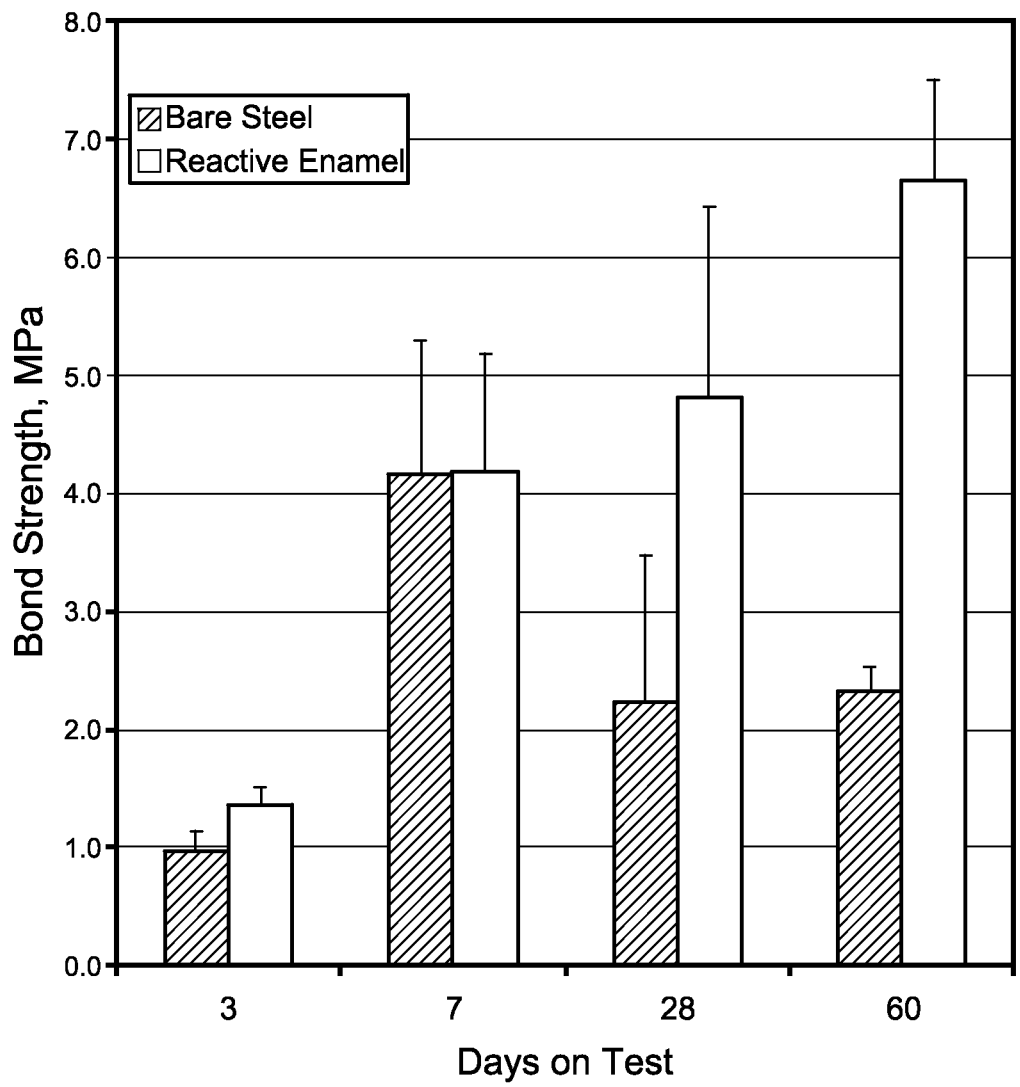
FIG. 5 shows the comparisons of average bond strengths (in MPa) for steel pins embedded in mortar after up to 60 days.

A series of pull-out tests was conducted to assess the bond strengths of the embedded coated rods 30 with several compositional embodiments of the glass coating material 20. The results of pull-out testing are shown in FIG. 5.

Preparation of Test Mortar.

Uncoated steel rods 10 and coated rods 30 were embedded in a mortar prepared using the guidelines presented in ASTM C109, Standard Method for Determining Compressive Strength of Hydraulic Mortars. The proportion of the standard mortar was one part cement (Type I) to 2.75 parts of standard graded sand. The water-to-cement ratio was maintained at 0.485. Test cylinders were prepared for each mortar batch and tested to investigate the compressive strength at 7 and 30 days.

Preparation and Testing of Embedded Rods for Pull-Out Testing.

Each uncoated 10 and glass coated test rod 30 was inserted in a 50.8-mm in diameter, 101.6-mm long plastic cylinder mold filled with fresh mortar. The respective rods 10, 30 were clamped at the top so that a 63.5-mm length of each respective rod 10, 30 was under the mortar; for the coated rods 30, the portion under mortar was glass coated. Each cylinder was tapped and vibrated to remove entrapped air and also to consolidate the mortar. The samples were kept in a 100% humidity environment at room temperature and cured, with curing times ranging from 7 days and to 60 days. After curing, the test cylinders were de-molded and the mounted in the test apparatus and the force required to pull each respective rod 10, 30 out of the mortar was measured using an Instron Model 4469 Universal Testing Machine.

The testing pin-pull results for steel after up to 60 days in mortar indicate that the bond strength of the uncoated pins decreases from about 4 MPa to about 2.2 MPa between seven days and 28 days of curing. This is consistent with reports in the literature for decreasing bond strength between cement paste and reinforcing steel with increasing curing time age, particularly from 1 to 14 days. However, due the hydration reaction of cement with the reactive Ca-silicate particles used for the glass coated samples 30, these bond strengths increase from 1.2 MPa to 6.60 kPa with an increase of curing time from three days to 60 days. Further, glass coated steel pins 30 with reactive calcium silicate have about three times the bond strength of bare steel pins after 60 days in cement.

Steel-reinforced concrete composite material 50 benefitting from increased bond strength and decreased degradation of the steel 10 from corrosive attack by the concrete matrix 40 give rise to a number of uses, such a structural material for floors and decking, hardened or reinforced civilian and military structures, sewage pipe, geotechnical anchorages, and the like. Further, the strong bond formed between the glass-coated steel 30 (with or without calcium silicate particles or the like dispersed therein as bonding enhancers) and the cementitious material 40 enables design options such as concrete-filled steel tubes or casings.

Further, the glass composition may be optimized to be self-sealing. As the glasses have relatively low softening temperatures, they are well suited for low temperature applications, such as retrofit and remediation applications. Additionally, glass-tape composites may be made with these compositions that may be wrapped around steel members and then fused thereto via the direct application of heat, such as by induction or a torch, to provide corrosion protection and/or an enhanced bonding surface.

Figure 6:
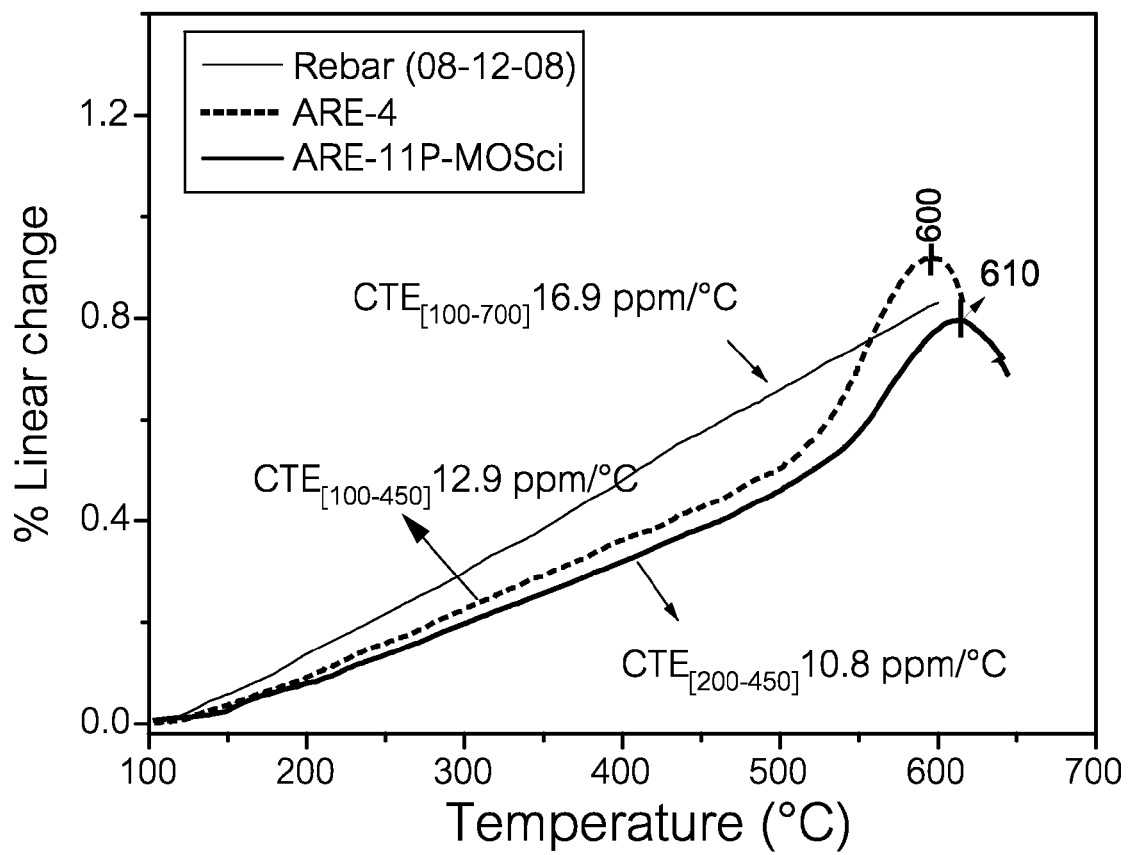
FIG. 6 is a graphical representation of the change in linear dimension vs. temperature of a steel rod and two vitreous coating compositions for the coated steel rods of FIG. 1.

Referring to FIG. 6, the change in linear dimension as a function of time is plotted for both a steel rod 10 and for two coating compositions (ARE-4 and ARE-11P). The rod 10 has a measured CTE of 16.9 ppm/° C., while the ARE-4 composition has a CTE of 12.9 ppm/° C. and the ARE-11P has a CTE of 10.8 ppm/° C. The CTE of the rod 10 is substantially constant over a temperature range of about 100 to about 700 degrees Celsius, while the CTE's of the glass coating compositions are substantially constant over ranges of between about 200 to about 450 degrees Celsius. Both compositions appear to beging to soften at about 500 degrees Celsius, resulting in a change in CTE in the 500 to 600 degree Celsius range.

The desired properties of the novel glass composite include 1) a coefficient of thermal expansion (CTE) that is more compatible with the steel alloy that is to be coated, 2) a softening temperature that is relatively low (<700° C.) to ensure low processing temperatures that do not degrade the mechanical properties of the steel, and 3) outstanding corrosion-resistance to the alkaline environment of wet cement. The novel glass composite comprises at least 4.0% (wt) $K_2O$ and at least 5.6% (wt) $ZrO_2$, with about 4-20% (wt) of $K_2O$, and/or about 5-20% (wt) of $ZrO_2$, whereas both $K_2O$ and $ZrO_2$ are significantly increased compared to the conventional groundcoats.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method for producing composite structural material comprising in combination:
   providing a cementitious matrix;
   positioning a plurality of steel reinforcing rods positioned in the cementious matrix; and
   substantially encapsulating each respective steel reinforcing rod in a vitreous shell; and
   substantially encasing the plurality of steel reinforcing rods in the cementitious matrix;
   wherein each respective steel reinforcing rod has a coefficient of thermal expansion of between about 14 ppm/° C. and about 17 ppm/° C.; and
   wherein each respective vitreous shell has a composition consisting essentially, in weight percent, of about 33-45% $SiO_2$, 3.5-4.6% $Al_2O_3$, 13.5-19.5% $B_2O_3$, 4-13.5% $K_2O$, and 5.5-15.5% $ZrO_2$; and
   wherein each respective vitreous shell has a coefficient of thermal expansion between about 12.5 ppm/° C. and about 13.5 ppm/° C.

2. The composite structural material method of claim 1 and further comprising a plurality of calcium silicate particles distributed throughout each respective vitreous shell.

3. The composite structural material method of claim 2 wherein the calcium silicate particles are bonded to the cementitious matrix.

4. The composite structural material method of claim 3 wherein the cementitious matrix is Portland cement.

5. The composite structural material method of claim 2 wherein the bond strength of the steel reinforcing rods in the cementitious matrix increases over time.

6. The composite structural material method of claim 1 and further comprising a plurality of zinc particles distributed throughout each respective vitreous shell.

7. A method of reinforcing concrete, comprising:
   coating a plurality of steel reinforcing members with thin glass layers, wherein the respective steel reinforcing members have a first coefficient of thermal expansion and wherein the respective thin glass layers have a second coefficient of thermal expansion substantially matching the first coefficient of thermal expansion; and
   forming a cementitious matrix around the plurality of steel reinforcing members;
   wherein the glass layers have a composition consisting essentially, in weight percent, of about 33-45% $SiO_2$, 3.5-4.6% $Al_2O_3$, 13.5-19.5% $B_2O_3$, 4-13.5% $K_2O$, and 5.5-15.5% $ZrO_2$.

8. The method of claim 7, wherein the steel reinforcing members have a composition selected from the group including ASTM A615, ASTM A706, ASTM A955 and ASTM A996.

9. The method of claim 7, wherein the glass layers have a coefficient of thermal expansion between about 12.5 and 13.5 ppm per degree Celsius.

10. The method of claim 7, wherein the glass layers contain about 10.5 to about 15.5 weight percent $ZrO_2$ and between about 13.0 and about 13.5 weight percent $K_2O$.

11. The method of claim 7, wherein the thin glass layers further comprise a plurality of calcium silicate particles distributed therethrough and wherein the calcium silicate bonds with the cementitious matrix.

12. The method of claim 4, wherein the thin glass layers further comprise a plurality of metal particles distributed therethrough; and wherein the metal particles function as sacrificial anodes in a cementitious environment.

13. The method of claim 12 wherein the metal particles are zinc.

14. A method of making a reinforced cementitious composite material, comprising:
   substantially encapsulating each of a plurality of respective steel reinforcing rods in a respective vitreous shell;
   distributing bond-enhancing particles throughout each respective vitreous shell;
   positioning the encapsulated steel reinforcing rods; and
   substantially encasing the plurality of steel reinforcing rods in a cementitious matrix;
   wherein each respective steel reinforcing rod has a coefficient of thermal expansion of between about 14 ppm/° C. and about 17 ppm/° C.; and
   wherein each respective vitreous shell has a composition selected from the group consisting essentially, in weight percent, of about 33-45% $SiO_2$, 3.5-4.6% $Al_2O_3$, 13.5-19.5% $B_2O_3$, 4-13.5% $K_2O$, and 5.5-15.5% $ZrO_2$; and
   wherein each respective vitreous shell has a coefficient of thermal expansion between about 12.5 ppm/° C. and about 13.5 ppm/° C.

15. The method of claim 14 wherein the bond-enhancing particles are metallic; and wherein the metallic bond-enhancing particles act as sacrificial anodes.

16. The method of claim 15 wherein the metallic bond-enhancing particles are zinc.

17. The method of claim 14 wherein the bond-enhancing particles are calcium silicate; and wherein the calcium silicate bond-enhancing particles bond with the cementitious matrix.

18. The method of claim 14 wherein the bond-enhancing particles include both calcium silicate particles and metallic particles.

* * * * *